US011382336B2

(12) United States Patent
Park et al.

(10) Patent No.: US 11,382,336 B2
(45) Date of Patent: Jul. 12, 2022

(54) EMULSIFIED OIL COMPOSITION FOR SUPPRESSING OFF-TASTE AND OFF-FLAVOR INCLUDING OIL CONTAINING POLYUNSATURATED FATTY ACIDS, FOOD CONTAINING THE SAME, AND METHODS FOR PREPARING THE SAME

(71) Applicant: COSMAX NBT, INC., Seoul (KR)

(72) Inventors: Jin Woo Park, Yongin-si (KR); Hye Jin Kim, Gwangju-si (KR); Hye Young Kim, Yongin-si (KR); Jee Ho Park, Yongin-si (KR); Gi Tae Choe, Gwangju-si (KR)

(73) Assignee: COSMAX NBT, INC., Seoul (KR)

( * ) Notice: Subject to any disclaimer, the term of this patent is extended or adjusted under 35 U.S.C. 154(b) by 280 days.

(21) Appl. No.: 16/558,757

(22) Filed: Sep. 3, 2019

(65) Prior Publication Data

US 2020/0305457 A1    Oct. 1, 2020

(30) Foreign Application Priority Data

Apr. 1, 2019  (KR) .................. 10-2019-0038063

(51) Int. Cl.
*A23D 9/06* (2006.01)
*A23L 21/10* (2016.01)
*A23D 9/013* (2006.01)

(52) U.S. Cl.
CPC .............. *A23D 9/06* (2013.01); *A23D 9/013* (2013.01); *A23L 21/10* (2016.08); *A23V 2002/00* (2013.01)

(58) Field of Classification Search
CPC ........... A23D 9/06; A23D 9/013; A23L 21/10; A23V 2002/00
USPC .................. 426/545, 573, 601, 615, 512
See application file for complete search history.

(56) References Cited

U.S. PATENT DOCUMENTS

| 2004/0265466 | A1 | 12/2004 | Takase et al. |
| 2007/0141211 | A1 | 6/2007 | Kolar, Jr. et al. |
| 2009/0111777 | A1 | 4/2009 | Ueshima et al. |
| 2013/0316061 | A1 | 11/2013 | Stefanski et al. |

(Continued)

FOREIGN PATENT DOCUMENTS

| CN | 107969701 A | 5/2018 |
| EP | 0659347 B1 | 8/2001 |
| FR | 3012292 A1 * | 1/2015 |

(Continued)

OTHER PUBLICATIONS

Examination report No. 1 for standard patent application, Application No. 2019204266, Office Action, Australian Patent Office, dated Sep. 27, 2019.

(Continued)

*Primary Examiner* — Helen F Heggestad
(74) *Attorney, Agent, or Firm* — BakerHostetler

(57) ABSTRACT

The present disclosure relates to emulsified oil composition including an oil containing a polyunsaturated fatty acid which is applicable to food, a rosemary extract, and a non-ionic surfactant, wherein the product quality of the food using the oil containing the polyunsaturated fatty acid is maintained during the processing and storage of the food, by preventing the oxidation of the oil containing the polyunsaturated fatty acid to suppress the production of a rancid flavor and an off-flavor.

12 Claims, 1 Drawing Sheet

(56) References Cited

U.S. PATENT DOCUMENTS

2016/0255852 A1  9/2016  Kato et al.
2018/0050007 A1  2/2018  Mizushima et al.

FOREIGN PATENT DOCUMENTS

| | | | |
|---|---|---|---|
| FR | 30122921 | * | 1/2015 |
| KR | 100343664 B1 | | 11/2002 |
| KR | 100951756 B | | 5/2004 |
| KR | 1020080070852 A | | 7/2008 |
| KR | 1020110121986 A | | 11/2011 |
| KR | 1020140088599 A | | 7/2014 |
| KR | 10-2016-0085745 A | | 7/2016 |
| KR | 10-2017-0139562 A | | 12/2017 |
| WO | 2008058361 A1 | | 5/2008 |
| WO | 2013066373 A1 | | 5/2013 |

OTHER PUBLICATIONS

Notice of Allowance for KR 10-2019-0038063, dated Jan. 25, 2022 and translation.

* cited by examiner

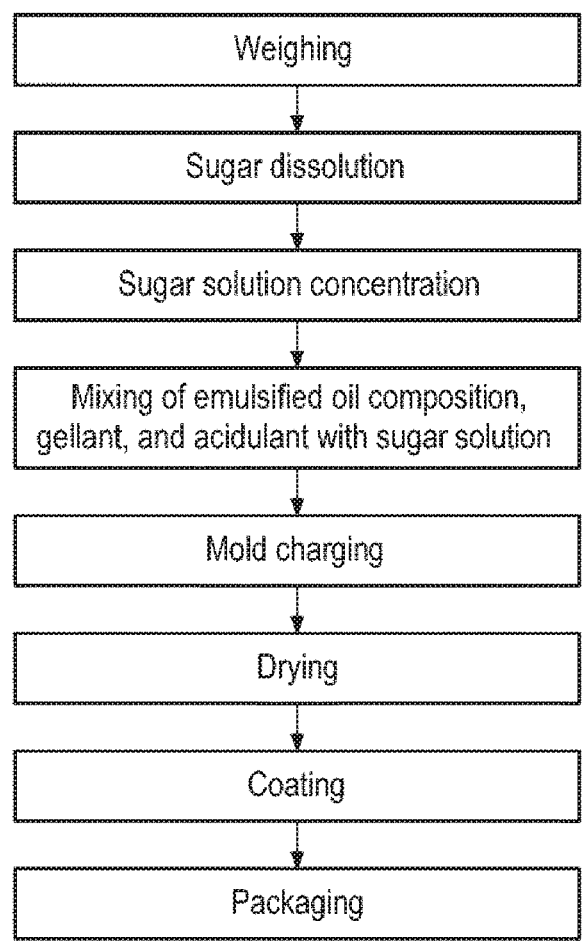

EMULSIFIED OIL COMPOSITION FOR SUPPRESSING OFF-TASTE AND OFF-FLAVOR INCLUDING OIL CONTAINING POLYUNSATURATED FATTY ACIDS, FOOD CONTAINING THE SAME, AND METHODS FOR PREPARING THE SAME

CROSS-REFERENCE TO RELATED APPLICATION

This application is based upon and claims the benefit of priority from Korean Patent Application No. 10-2019-0038063, filed on Apr. 1, 2019, the entire contents of which are incorporated herein by reference.

TECHNICAL FIELD

The present disclosure relates to emulsified oil composition including an oil containing polyunsaturated fatty acids, food containing the emulsified oil composition, and methods for preparing the emulsified oil composition and food.

BACKGROUND

The recent aging population and changes in consumer preferences have led to a steep growth in health functional food market. Consumer preferences are changing from the existing paradigm of disease treatment to a disease prevention paradigm to maintain health, and therefore, the demand for reliable and easy-to-eat health functional food is on the rise.

Among the ingredients used in health functional foods, polyunsaturated fatty acids are known to show a variety of useful effects. Omega-3 fatty acids lead to the improvement of eyesight by retinal actions, activation of brain cells, alleviation or prevention of dementia, improvement of triglyceride levels in blood, improvement of blood circulation, alleviation of hyperlipemia, prevention of arteriosclerosis and coronary heart disease, cholesterol regulation, prevention of blood clotting, lowering of blood pressure, memory enhancement, enhancement of learning capability, and anti-inflammatory, anti-tumor, or antiallergic effect. For example, o+mega-6 fatty acids play an important role in the body as both structural lipids and precursors with respect to prostaglandins and leukotrienes. However, polyunsaturated fatty acids are not synthesized in the human body and thus should be supplied through separate intake sources. In particular, eicosapentaenoic acid (EPA) and docosahexaenoic acid (DHA) are effective in lowering blood cholesterols, improve blood circulation, and are the main ingredients of retinal cells and cerebral hippocampus cells and thus are effective in enhancing memory and supplying nutrients to the brain. Therefore, the importance of taking EPA and DHA for people of all ages, both male and female, including children and the elderly has been emphasized. For example, the Health Functional Food Code contains information regarding functionality that, a daily intake of 0.5-2.0 g for EPA and DHA can help improve triglyceride levels in blood and blood circulation, 0.9-2.0 g can help enhance memory, and 0.6-1 g can help improve eye health by alleviating dry eyes. Thus, products including EPA and are commercially available.

The intake of such polyunsaturated fatty acids can be achieved by ingestion of oils containing these ingredients, and most health functional foods are manufactured using such oils. However, polyunsaturated fatty acid-containing oils are poor in terms of oxidation stability since the oils can be easily oxidized by oxygen, light, heat, and the like, and the oxidation of the polyunsaturated fatty acid-containing oils results in a rancid flavor, an off-taste, or an off-flavor. These characteristics cause consumers to experience a fishy or offensive taste or flavor when or after ingesting health functional foods, and makes it difficult for the consumers to ingest such health functional foods.

Therefore, in order to prevent the oxidation of polyunsaturated fatty acid-containing oils and the resulting off-taste or off-flavor, most health functional foods are sold in the form of a soft capsule having gelatin as a coating. However, capsules are difficult for the elderly, infants, or children having reduced swallowing capability to ingest. In order to overcome the above, a variety of products in forms such as candy, beverage, and jelly, are preferred.

In addition, various techniques have been developed to prevent the rancidity of polyunsaturated fatty acid-containing oils in foods and to prevent the off-taste or off-flavor. For example, Korean Patent Publication No. 10-2011-0121986 describes that in order to suppress the oxidation of fish oil and the fishy smell thereof, a fish oil-containing double jelly is manufactured by first preparing a fish oil-containing alginic acid and then including the alginic acid in a gelation solution.

However, it is difficult to use only such methods to mask the off-taste or off-flavor of polyunsaturated fatty acid-containing oils which occurs when processing or storing health functional foods for a long period of time.

Therefore, the inventors of the present application developed an emulsified oil composition capable of masking the rancid flavor or off-flavor of polyunsaturated fatty acid-containing oils very remarkably through a simple method.

SUMMARY

In order to solve the problem of the existing products as above, the present disclosure provides an emulsified oil composition and a method for preparing the emulsified oil composition, wherein the emulsified oil composition prevents the oxidation of an oil containing polyunsaturated fatty acid that may occur during the processing or long-term storage thereof, thereby masking (shielding) the off-taste (for example, fishy taste), an off-flavor, or a rancid flavor (for example, a fishy odor) resulting from the oxidation.

Furthermore, the present disclosure provides health functional food containing an emulsified oil composition and a method for preparing the health functional food, wherein the oil containing polyunsaturated fatty acids can be provided in various forms other than a soft capsule, and the product quality of the health functional food can be maintained since an off-flavor or a rancid flavor is not produced even during the processing or storage of the health functional food.

In order to solve the above problems, the present inventors endeavored to develop a composition capable of masking an off-taste, a rancid flavor, or an off-flavor from refined fish oil, which is an oil containing polyunsaturated fatty acids. As a result, the present inventors confirmed that an emulsified oil composition, which is prepared by mixing an oil containing polyunsaturated fatty acids which can be applied to food with a rosemary extract having an excellent ability to scavenge free radicals which are one of the causes of oxidation and a non-ionic surfactant enabling emulsification, shows an effect of remarkably masking the off-taste, rancid flavor, or off-flavor in the sensory evaluation of food containing the emulsified oil composition, and therefore, the present inventors completed the present disclosure.

The embodiments or aspects of the present disclosure are illustrated for purposes of describing the technical idea of the present disclosure. The scope of the present disclosure is not limited to the embodiments or aspects or the detailed description thereof described below.

All technical and scientific terms used in the present disclosure have the meaning generally understood by a person having ordinary skill in the art to which this disclosure pertains, unless otherwise defined. All terms used in the present disclosure are chosen for the purpose of more clearly describing the present disclosure and are not chosen to limit the scope according to the present disclosure.

As used in the present disclosure, expressions such as "comprising", "including", and "having" are to be understood as open-ended terms having the possibility of encompassing other embodiments, unless otherwise mentioned in the phrase or sentence containing such expressions.

Expressions such as "consisting of only" the corresponding elements used in this disclosure should be understood as a closed-ended term excluding the possibility of including other elements besides the corresponding elements.

A singular form described in the present disclosure may include a plural meaning, unless otherwise mentioned, and this applies equally to the singular forms recited in the claims.

In one aspect of the present disclosure, the term "about" has been used herein to include a slight numerical adjustment that falls within the errors in the manufacturing process included in a specific value or the scope of technical idea of the present disclosure. For example, the term "about" means a range of ±10% of the value it refers to, ±5% in one aspect, and ±2% in another aspect. In the field of this disclosure, this level of approximate value is appropriate unless the value is specifically stated to require a narrower range.

Hereinafter, an emulsified oil composition including an oil containing polyunsaturated fatty acids which can be applied to food, a rosemary extract, and a non-ionic surfactant, according to one aspect of the present disclosure, will be described in detail.

1. Emulsified Oil Composition Including Oil Containing Polyunsaturated Fatty Acids One aspect of the present disclosure may relate to an emulsified oil composition including an oil containing polyunsaturated fatty acids which can be applied to food, a rosemary extract, and a non-ionic surfactant.

In the present disclosure, the term "polyunsaturated fatty acid" may refer to a fatty acid including two or more carbon-carbon double bonds in one molecule, and the polyunsaturated fatty acids may be classified into omega-3 fatty acids, omega-6 fatty acids, and the like according to the position of the double bond. The omega-3 polyunsaturated fatty acid may be α-linolenic acid (ALA), eicosapentaenoic acid (EPA), hexadecatrienoic acid (HTA), stearidonic acid (SDA), eicosatrienoic acid (ETE), eicosatetraenoic acid (ETA), heneicosapentaenoic acid (EPA), tetracosapentaenoic acid, tetracosahexaenoic acid, docosapentaenoic acid (DPA), or docosahexaenoic acid (DHA), and the omega-6 unsaturated fatty acid may be linoleic acid, gamma (γ)-linolenic acid (GLA), calendic acid, eicosadienoic acid, dihomo-gamma (γ)-linolenic acid (DGLA), docosadienoic acid, adrenic acid, tetracosatetraenoic acid, tetracosapentaenoic acid, or arachidonic acid (AA), but are not limited thereto.

In another aspect of the present disclosure, the oil containing polyunsaturated fatty acids may originate from at least one raw material selected from the group consisting of fish, algae, and sea lions.

In another aspect of the present disclosure, the polyunsaturated fatty acid may be an omega-3-fatty acid or an omega-6-fatty acid, and may be a fatty acid having 16 to 24 carbon atoms. For example, the polyunsaturated fatty acid may contain at least one selected from the group consisting of eicosapentaenoic acid, docosapentaenoic acid, docosahexaenoic acid, linoleic acid, linolenic acid, and arachidonic acid.

In another aspect of the present disclosure, the oil may contain the polyunsaturated fatty acid in about 30 to about 70 wt %, about 40 to about 60 wt %, or about 45 to about 60 wt % relative to the total weight of the oil.

In another aspect of the present disclosure, the emulsified oil composition may include the oil containing the polyunsaturated fatty acid in about 30 to about 98 wt %, about 50 to about 98 wt %, about 70 to about 98 wt %, or about 85 to about 95 wt %, relative to the total weight of the composition. If the amount of the oil containing the polyunsaturated fatty acid is less than the above lower limit, it is difficult to ingest the polyunsaturated fatty acid more than the recommended amount. If the amount thereof is more than the above upper limit, the amount of the ingredients other than the oil containing the polyunsaturated fatty acid may be low and thus it may be difficult to homogeneously mix the oil containing the polyunsaturated fatty acid with the other raw materials when preparing the food.

In the present disclosure, the term "rosemary extract" may refer to an extract derived from *Rosmarinus officinalis*, which is a member of the genus *Rosmarinus* and the family *Lamiaceae* and comes from the Mediterranean region, and the flowers, leaves, and sprouts of this plant may be used as a raw material. The rosemary extract can exhibit antibacterial, antioxidative, or anti-inflammatory effects.

In the present disclosure, the rosemary extract can perform the role as a deodorant to remove the offensive odor or a role as an air freshener to provide a refreshing scent, and the rosemary extract also has a sterilization function, an antibacterial function, and an antioxidative function, and thus can prevent the rancidification of foods and remove the off-flavor. In addition, carnosic acid, carnosol, rosmarinic acid, and the like, which are the main ingredients of the rosemary extract, are antioxidative substances, can prevent the rancidification of foods or suppress the activity of microorganisms, thereby suppressing the production of a rancid flavor and off-flavor of the oil containing the polyunsaturated fatty acid and enhancing the preservability of foods.

In the present disclosure, the term "off-flavor" may refer to a broad concept encompassing an off-flavor, a spoiled flavor, an unpleasant flavor, or a deteriorating flavor, which is secondarily caused by chemical changes of food ingredients or external incorporation thereof. Also, a contaminated flavor by the incorporation of a different substance, a freshness deteriorating flavor, a rancid flavor, an oxidized flavor, a sunlight flavor, and cooked flavor may all correspond to off-flavors. Specifically, the off-flavor may mean a bad smell caused from the oil containing the polyunsaturated fatty acid per se or a smell caused by the rancidification of the oil containing the polyunsaturated fatty acid due to the contact thereof with oxygen.

The rosemary extract of the present disclosure may be obtained by a general extraction method, and for example, may be obtained by immersing a plant in an extraction solvent or heating the plant together with an extraction solvent under reflux, followed by filtration and concentration. In this case, any extraction solvent may be used as long as it is a solvent used for general extraction, and examples of the extraction solvent may be at least one selected from water, alcohols, such as methanol, ethanol, propylene glycol, 1,3-butylene glycol, and glycerin, hydrous alcohols, and organic solvents, such as chloroform, dichloroethane, carbon tetrachloride, acetone, ethyl acetate, and hexane.

In one aspect of the present disclosure, the emulsified oil composition may include the rosemary extract in about 0.01 to about 5 wt %, about 0.1 to about 4 wt %, about 0.2 to about 3 wt %, or about 0.3 to about 2 wt %, relative to the total weight of the composition.

In another aspect of the present disclosure, the rosemary extract may contain carnosic acid in about 2 to 10 wt %, about 3 to 8 wt %, or about 4 to 7 wt %. The term "carnosic acid" refers to benzenediol abietane diterpene which is found in *Rosmarinus officinalis*, Salviaofficinalis, and the like, and is a compound having strong antioxidant capacity. If the amount of carnosic acid is less than the above lower limit, it is difficult to prevent the rancidification of the oil containing the polyunsaturated fatty acid, and if the amount thereof is more than the above upper limit, the extraction process is uneconomical and inefficient and efficacy to inhibit rancidification cannot be sufficiently obtained relative to the amount.

In the present disclosure, when preparing food containing the emulsified oil composition of the present disclosure, the non-ionic surfactant may be added as an emulsifier to homogeneously mix the emulsified oil composition of the present disclosure with the other raw materials contained in the food. In one aspect of the present disclosure, the non-ionic surfactant may be at least one selected from lecithin, sucrose fatty acid esters, sorbitan fatty acid esters, polyoxyethylene, glycerin fatty acid esters and derivatives thereof, and polyglycerin fatty acid esters.

In the present disclosure, the emulsified oil composition may include the non-ionic surfactant in about 0.5 to 10 wt %, about 1 to 8 wt %, or about 2 to 6 wt %, relative to the total weight of the composition. If the amount of the non-ionic surfactant is less than the above lower limit, it may be difficult to homogeneously mix the emulsified oil composition with the other raw materials when preparing the food, and if the amount thereof is more than the above upper limit, the flavor may become worse in the food, especially in jelly type food.

In one aspect of the present disclosure, the emulsified oil composition may further include another antioxidant in addition to the rosemary extract. The antioxidant of the present disclosure acts on free radicals and peroxides produced during the oxidation of food ingredients by oxygen in the air, thereby stopping the chain reactions of oxidation, preventing the progression of oxidation, and preventing food deterioration, that is, preventing the off-taste, off-flavor, discoloration, or manifestation of toxicity, resulting from the rancidification of oil. For example, the antioxidant of the present disclosure may be at least one selected from tocopherol ($\alpha$-tocopherol, $\beta$-tocopherol, $\gamma$-tocopherol, or $\delta$-tocopherol), vitamin C, ascorbyl palmitate, ethylenediaminetetraacetic acid (EDTA), dibutylhydroxytoluene, polyphenols, phenol derivatives, lipoic acid, aromatic carboxylic acids, and salts of aromatic carboxylic acids. The emulsified oil composition of the present disclosure may include a combination of tocopherol and ascorbyl palmitate, which is a fat-soluble antioxidant, but is not limited thereto.

In the present disclosure, the antioxidant, such as vitamin C, ascorbyl palmitate, or ethylenediaminetetraacetic acid, chelates metal ions, and thus prevents the oxidation that may occur due to contact of the oil containing the polyunsaturated fatty acid with the mixing tank made of a metal material, which is used to mix raw materials in the manufacturing process of the food containing the oil containing the polyunsaturated fatty acid, thereby further suppressing the production of rancid flavor and an off-flavor.

In the present disclosure, the other antioxidant further included in the emulsified oil composition in addition to the rosemary extract may be contained in about 0.005 to 1 wt %, about 0.01 to 1 wt %, or about 0.05 to 1 wt % relative to the total wt % of the composition.

In one aspect of the present disclosure, the emulsified oil composition may further include a vegetable oil or a flavoring in about 1 to 10 wt %, about 2 to 8 wt %, or about 2 to 6 wt %, respectively.

In the present disclosure, the vegetable oil may be included for use in adjusting the weight of the emulsified oil composition. For example, the vegetable oil may be at least one selected from grape seed oil, rice bran oil, palm oil, olive oil, corn oil, hydrogenated oil, rapeseed oil, soybean oil, safflower oil, sesame oil, cottonseed oil, and sunflower oil, but is not limited thereto.

In one aspect of the present disclosure, the flavoring may be included to mask off-flavor and off-taste, which are specific to oil containing polyunsaturated fatty acids. For example, the flavoring may be at least one selected from strawberries, grapes, apples, bananas, oranges, lemons, berries, cherries, mixed berries, watermelons, vanilla, butter, spice, mint, and herb flavors, but is not limited thereto.

2. Health Functional Food Containing an Emulsified Oil Composition

In one aspect, the present disclosure may relate to a food containing the emulsified oil composition according to one aspect of the present disclosure.

In another aspect of the present disclosure, the food may be a health functional food. The health functional food of the present disclosure can be prepared by a method that is commonly used in the art, and can be prepared by adding raw materials and ingredients that are commonly added in the art at the time of manufacturing. The health functional food of the present disclosure may be prepared in various forms, and for example, may be prepared in a general formulation for oral intake, such as a jelly (including gummy candies), a candy, a beverage, a liquid gel, a tablet, a pill, a hard capsule, a soft capsule, or granules. The health functional food containing the emulsified oil composition of the present disclosure may be preferably a jelly type food, a candy type food, or a beverage type food, but is not limited thereto.

In an aspect of the present disclosure, the health functional food may be a jelly type food containing an emulsified oil composition, a gellant, an acidulant, a sugar solution, and other additives. The jelly type food may be prepared to have various shapes, such as animals that children or adolescents like.

In the present disclosure, the term "jelly" may refer to a semi-solid food, which is made by using a gellant and has excellent storageability, and may refer to the broadest concept encompassing liquid jellies and gummy candies.

In the present disclosure, the term "gellant" is a substance having the ability to form a gel, and may refer to a substance that is widely used in food manufacturing, processing, cooking, and the like. For example, the gellant may be at least one selected from the group consisting of starch, agar, pectin, gelatin, xanthan gum, alginate, and carrageenan. Specifically, the gellant may be pectin and gelatin, but is not limited thereto. In one aspect of the present disclosure, the gellant may be contained in about 1 to 15 wt % relative to the total weight of the jelly type food. If the amount of the gellant is less than the above lower limit, a jelly having a suitable chewing texture cannot be produced, and if the amount thereof is more than the above upper limit, the jelly becomes hard, resulting in a bad texture.

In the present disclosure, the "acidulant" may be used to give a refreshing taste to the jelly. For example, the acidulant may be at least one selected from the group consisting of citric acid, anhydrous citric acid, sodium citrate, tartaric acid, malic acid, fumaric acid, succinic acid, and vitamin C. In one aspect of the present disclosure, the acidulant may be contained in about 0.1 to 3 wt % relative to the total weight of the jelly type food. If the amount of the acidulant is less than the above lower limit, a consumer cannot feel a sour taste and thus such an amount is not preferable from a sensory aspect. If the amount thereof is more than the above upper limit, the sour taste of the jelly is increased, resulting in negative influences on the sensory and gel strengths. Especially, such an acidulant as citric acid, anhydrous citric acid, and sodium citrate can be used for proper gelation by pH adjustment, and can prevent microbial growth.

In one aspect of the present disclosure, the sugar may be at least one selected from the group consisting of sugar, glucose, fructose, taffy, sugar syrups, dextrin, oligosaccharides, honey, propolis, and sugar alcohols (xylitol, maltitol, sorbitol, and the like), but is not limited thereto. The use of a sugar having a deodorizing effect, such as cyclodextrin, can achieve the additional effect of masking the sensory properties of the oil containing the polyunsaturated fatty acid.

In another aspect of the present disclosure, the health functional food may further include other additives. In the present disclosure, the term "additive" may refer to a food supplement additive that can be added to food as a supplement, and the additive is added in preparing each formulation of health functional food and can be properly selected and used by a person skilled in the art. Examples of the additive may be a flavoring (for example, orange oil, peppermint oil, or apple flavor), a preservative (for example, methyl paraoxybenzoate or propyl paraoxybenzoate), a pH adjusting agent (for example, acetic acid, phosphoric acid, sodium hydrogen carbonate, or sodium hydroxide), a buffer, a colorant, a foamer (for example, silicone oil), and the like, but are not limited thereto.

In the present disclosure, the term "health functional food" may refer to a food that is manufactured and processed in the form of a tablet, a capsule, a powder, granules, a liquid, and a pill by using raw materials or ingredients having functionality that is useful to the human body. Here, the term "functionality" may refer to obtaining effects useful for health purposes, such as nutrient control or physiological actions, with respect to structures and functions of the human body.

3. Method for Preparing an Emulsified Oil Composition or Health Functional Food Containing the Same The emulsified oil composition of the present disclosure can be prepared by mixing about 30 to 98 wt % of an oil having a polyunsaturated fatty acid which can be applied to food, about 0.01 to 5 wt % of a rosemary extract, and about 0.5 to 10 wt % of a non-ionic surfactant, together with the other additives.

The emulsified oil composition of the present disclosure can be prepared by a preparation method comprising: (i) introducing an oil containing a polyunsaturated fatty acid, a rosemary extract, a non-ionic surfactant and the other additives into a Homo Mixer, followed by mixing at about 500 to 1000 rpm at a temperature condition of about 40 to 70° C. for about 10 to 30 minutes; and (ii) mixing the mixture more homogeneously using a homogenizer.

In one aspect of the present disclosure, the emulsified oil composition may be used in the preparation of the health functional food. The health functional food containing the emulsified oil composition can be prepared by employing any method for preparing food, such as candy, beverage, or jelly (gummy candy).

In another aspect, the present disclosure may relate to a method for preparing a jelly type food containing the emulsified oil composition. The method for preparing the jelly type food containing the emulsified oil composition may include: preparing an emulsified oil composition; preparing a jelly type food composition by mixing the prepared emulsified oil composition with a sugar solution, a gellant, an acidulant, and the like; and cooling and/or drying the jelly type composition to provide the jelly type composition in the form of a jelly type food.

In another aspect of the present disclosure, the method for preparing a jelly type food containing an emulsified oil composition may include: homogeneously mixing about 30 to 98 wt % of an oil containing a polyunsaturated fatty acid which can be applied to food, about 0.01 to 5 wt % of a rosemary extract, about 0.5 to 10 wt % of a non-ionic surfactant, and the other additives at 40-70° C. to prepare an emulsified oil composition; mixing the emulsified oil composition, a gellant, an acidulant, a sugar solution and the like to prepare a jelly type food composition; and placing the jelly type food composition in a mold, followed by drying at about 15 to 25° C.

In another aspect of the present disclosure, the method for preparing a jelly type food containing an emulsified oil composition may include: dissolving a sugar in water to prepare a sugar solution; concentrating the sugar solution; mixing an emulsified oil composition, a gellant, and an acidulant, and the like with the concentrated sugar solution; and drying and/or cooling the mixture, as shown in FIG. 1.

In another aspect of the present disclosure, the method for preparing a jelly type food containing an emulsified oil composition may include: weighing raw materials; stirring the raw materials to dissolve in respective blending tanks; concentrating a sugar solution, which has been prepared by dissolving a sugar in water; introducing the sugar solution, the raw material solutions, a flavoring, and the like into a mixing tank; filtering the mixture and then charging the filtered mixture into a mold; transferring the mold to a drying room, followed by drying.

In another aspect of the present disclosure, the preparation method may further include coating the dried jelly. The dried jelly may be coated with a coating powder and/or a coating oil, and for example, the coating oil ay be at least one selected from the group consisting of refined and processed oil, medium chain triglyceride (MCT) oil, carnauba wax, vegetable oil, vegetable fat, and beeswax, but is not limited thereto. The present disclosure includes the coating of the dried jelly, and thus can prevent the agglomeration of the jelly, maintain releasability, and suppress moisture absorption to prevent the oxidation of the polyunsaturated fatty acid contained in the jelly.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 1 shows a process diagram illustrating an example of a process for preparing a jelly containing an emulsified oil composition of the present disclosure.

DETAILED DESCRIPTION

Hereinafter, the features and effects of the present disclosure will be described in detail with reference to examples and test examples. However, these examples and test examples are provided merely for the purpose of helping the understanding of the present disclosure, and thus the scope and range of the present disclosure are not limited to the following examples.

Preparation of Emulsified Oil Composition

The emulsified oil composition of the present disclosure was prepared as below.

Examples 1 to 3

Refined fish oil (VIVOMEGA, 3322 EE/TG, EPA+DHA content: 55%), a rosemary extract (KEMIN, Fortium R40, leaf extract, carnosic acid content: 5%), tocopherol (BASF), ascorbyl palmitate (DSM), glycerin fatty acid ester (Ilshin Wells), grape seed oil (OTTOGI), and a berry flavoring (French and Korea Aromatics) were weighed according to the amounts in Table 1 below, and added into a mixing tank. The raw materials were mixed at about 1000 rpm for about 20 minutes at about 50 to 60° C. using a Homo Mixer until the raw materials were homogeneously mixed. The homogeneously mixed mixture was subjected to an atomization treatment by passing through a homogenizer once under the pressure of 70 psi, thereby obtaining a homogeneous emulsified oil composition.

Comparative Example 1

As shown in Table 1, 90 wt % of refined fish oil, 5 wt % of glycerin fatty acid ester, and 5 wt % of grape seed oil were added into a mixing tank. Thereafter, a composition of the comparative example was prepared by the same method as in Examples 1 to 3.

TABLE 1

|  | Comparative Example 1 | Example 1 | Example 2 | Example 3 |
|---|---|---|---|---|
| Refined oil | 90 | 90 | 90 | 90 |
| Rosemary extract | — | 0.5 | 0.5 | 1 |
| D-α-tocopherol | — | 0.5 | 0.5 | 0.5 |
| ascorbyl palmitate | — | — | 0.01 | 0.05 |

TABLE 1-continued

|  | Comparative Example 1 | Example 1 | Example 2 | Example 3 |
|---|---|---|---|---|
| glycerin fatty acid ester | 5 | 5 | 5 | 5 |
| Grape seed oil | 5 | 4 | 0.99 | 0.45 |
| Mixed berry flavoring | — | — | 3 | 3 |
| Total (wt %) | 100 | 100 | 100 | 100 |

(All units for the numerical figures in the table are wt %)

Preparation of Jelly Type Food Containing Emulsified Oil Composition

Jelly type foods containing the emulsified oil composition according to one aspect of the present disclosure are in the form of a gummy candy. The respective foods satisfying the mixing ratios and amounts on Table 2 below were prepared using the emulsified oil compositions in Examples 1 to 3 and Comparative Example 1. Such emulsified oil compositions were each contained in an amount of 5 wt % relative to the total weight of the jelly type food. The amount of EPA and DHA per piece (3 g) in the prepared jelly type food was about 74.24 mg, and when a consumer ingests seven pieces of the prepared jelly type food, the amount of EPA and DHA was about 519.75 mg.

TABLE 2

| Name of raw material | Mixing ratio (wt %) | Amount (mg) per piece of jelly (3 g) |
|---|---|---|
| Starch syrup | 35.00% | 1050 |
| Sugar | 35.55% | 1066.5 |
| Pectin | 0.25% | 7.5 |
| Sodium citrate | 0.50% | 15 |
| Purified water | 9.00% | 270 |
| Gelatin (Pork skin) | 7.00% | 210 |
| Emulsified oil composition of Examples 1 to 3 or Comparative Example 1 | 5.00% | 150 |
| Cyclodextrin syrup | 5.00% | 150 |
| Lemon concentrate juice | 0.20% | 6 |
| Lemon flavoring | 0.80% | 24 |
| Citric acid (anhydrous) | 1.50% | 45 |
| Coating oil R-2 (mixture of refined and processed oil, carnauba wax, and beeswax) | 0.20% | 6 |
| Total | 100.00% | 3000 |

Example 4

(1) Preparation of Raw Material Solutions

Gelatin (pork skin) and purified water, anhydrous citric acid and purified water, and the emulsified oil composition of Example 1 and cyclodextrin were dissolved in the respective blending tanks. Stirring was carried out until the raw materials were completely dissolved, and a gelatin solution, an anhydrous citric acid solution, and an emulsified oil composition solution were obtained.

(2) Sugar Dissolution and Concentration

Previously weighed purified water, starch syrup, sugar, pectin, and sodium citrate were introduced into a mixing tank, and mixed therein. The mixture was stirred with heating at a temperature of about 100 to 110° C., and concentrated to 84-88 Brix.

(3) Mixing

The gelatin solution previously prepared in (1) above was mixed with the concentrate of the sugar solution in the mixing tank, and then the anhydrous citric acid solution and the emulsified oil composition solution were sequentially added thereto, followed by mixing at a temperature of 70 to 80° C. Finally, a lemon concentrate juice and a lemon flavoring were added, and mixed using a mixer with heating and stirring until uniform morphology was confirmed. As a result, a homogeneous mixture satisfying 78.5±2 Brix was obtained.

(4) Charging and Drying

The desired molds were prepared on a starch tray, and the homogeneous mixture prepared in (3) above was charged into the molds in an amount of about 3.15 g each and thus was molded into a jelly shape. Upon the completion of charging, the tray with the molds was transferred into a drying room, and dried under conditions of a temperature of 15-25° C. and a humidity of 40% or less. After the drying, the tray was transferred into a depositor, followed by demolding and coating with 0.20 wt % of coating oil R-2 (a mixture of refined and processed oil, carnauba wax, and beeswax). Finally, jelly type foods having 82.5±1 Brix, an activity of water (AW) of 0.8 or less, and pH 3.4±0.2 were obtained.

Example 5

Jelly type foods were prepared by the same method as Example 4 except that the emulsified oil composition of Example 2 was used instead of the emulsified oil composition of Example 1.

Example 6

Jelly type foods were prepared by the same method as Example 4 except that the emulsified oil composition of Example 3 was used instead of the emulsified oil composition of Example 1.

Comparative Example 2

Jelly type foods were prepared by the same method as Example 4 except that the emulsified oil composition of Comparative Example 1 was used instead of the emulsified oil composition of Example 1.

[Test Example] Sensory Evaluation of Taste and Smell of Jelly Type Foods Including Oil Containing Polyunsaturated Fatty Acids Each of the jelly type foods prepared above were subjected to a sensory evaluation, and the results are shown in Table 3 below. The sensory evaluation was carried out by seven test members for the jelly type foods of Examples 4 to 6 and Comparative Example 2, which were stored under refrigeration and normal temperature conditions according to the time. The refrigeration storage condition was a humidity of 20% or less at a temperature of 4° C., and the normal temperature storage condition was a humidity of 60±5% at a temperature of 30±5° C. As for the sensory evaluation, after seven jellies were ingested at once, scores were given from 0 point to 5 points according to the degree of specific flavor and off-taste, and then the scores were aggregated and calculated as average grades.
  0 Point: Little off-taste and specific flavor
  1 Point: Slight off-taste and specific flavor
  2 Points: Some off-taste and specific flavor
  3 Points: Off-taste and specific flavor, but ingestible
  4 Points: Severe off-taste and specific flavor, but ingestible
  5 Points: Severe off-taste and specific flavor, and non-ingestible

TABLE 3

| | | Comparative Example 2 | Example 4 | Example 5 | Example 6 |
|---|---|---|---|---|---|
| 0 Day | Refrigeration (4° C.) | 0.38 | 0.25 | 0.25 | 0.25 |
| 2 Weeks | Refrigeration (4° C.) | 1.71 | 0.57 | 0.43 | 0.57 |
| | Room temperature (30° C.) | 3.86 | 2.43 | 1.29 | 1.43 |
| 4 Weeks | Refrigeration (4° C.) | 2.14 | 0.86 | 0.86 | 0.71 |
| | Room temperature (30° C.) | 5 | 2.57 | 2 | 1.71 |
| 6 Weeks | Refrigeration (4° C.) | 2.29 | 1.14 | 0.57 | 0.43 |
| | Room temperature (30° C.) | 5 | 3.14 | 2.14 | 1.86 |
| 8 Weeks | Refrigeration (4° C.) | 2.57 | 1.71 | 0.71 | 0.86 |
| | Room temperature (30° C.) | 5 | 3.29 | 2.29 | 2.14 |

As can be seen from Table 3 above, the rancid flavor or off-taste from the oil containing the polyunsaturated fatty acid was remarkably masked when jelly type foods were prepared using the emulsified oil composition according to one aspect of the present disclosure. The jelly type foods prepared from the emulsified oil composition of the present disclosure (Examples 4 to 6) had little or slightly off-taste and specific flavor during refrigeration (4° C. for even 8 weeks. In addition, the jelly type foods had slightly or some off-taste and specific flavor during storage for 4 weeks at room temperature (30° C.), and were also ingestible without much influence on the off-taste or specific flavor during storage for 8 weeks. In particular, it could be especially confirmed that the rancid flavor or off-taste was greatly masked in Examples 5 and 6 which contain ascorbyl palmitate compared with Example 4 which does not contain ascorbyl palmitate.

On the other hand, the jelly type foods (Comparative Example 2) prepared from the emulsified oil composition of Comparative Example 1, which contains only refined fish oil, non-ionic surfactant, and vegetable oil, had an off-taste and specific flavor or severe off-taste and specific flavor during the storage at room temperature (30° C.) for two weeks, and had severe off-taste and specific flavor and thus were not ingestible after storage for 4 weeks.

The emulsified oil composition according to an aspect of the present disclosure prevents the oxidation of the oil containing the polyunsaturated fatty acids while the food containing the polyunsaturated fatty acids is prepared or stored, thereby suppressing the production of a rancid flavor and eliminating the off-flavor, thus showing the effect of maintaining the quality of the food.

Furthermore, the emulsified oil composition according to an aspect of the present disclosure shows an effect of preparing food with excellent physical stability and morphology since the oil containing the polyunsaturated fatty acids can be homogeneously mixed during the preparation of the food containing the polyunsaturated fatty acids.

Due to such effects, the food containing the emulsified oil composition of the present disclosure only has a slight smell compared with conventional products, and thus a consumer can easily ingest the food containing the emulsified oil composition, and especially, a consumer group having difficulty in ingesting polyunsaturated fatty acid-containing products that are mainly prepared as soft capsules can ingest the polyunsaturated fatty acid in the form of a jelly, such as gummy candy. Therefore, it is expected that the present disclosure would solve and overcome the drawbacks of the conventional products.

While the present disclosure has been described with reference to the particular illustrative embodiments, a person skilled in the art to which the present disclosure pertains can understand that the present disclosure may be embodied in other specific forms without departing from the technical spirit or essential characteristics thereof. Therefore, the embodiments described above should be construed as being exemplified and not limiting the present disclosure. The scope of the present disclosure is not defined by the detailed description as set forth above but by the accompanying claims of the disclosure, and it should also be understood that all changes or modifications derived from the definitions and scopes of the claims and their equivalents fall within the scope of the disclosure.

What is claimed is:

1. A jelly type food comprising an emulsified oil composition, and a gellant, wherein the emulsified oil composition comprises:
    30-98 wt % of an oil containing a polyunsaturated fatty acid which is applicable to food;
    0.01-5 wt % of a rosemary extract;
    0.5-10 wt % of glycerin fatty acid esters;
    0.005-1 wt % of tocopherol;
    0.005-1 wt % of ascorbyl palmitate; and
    1-10 wt % of a flavoring.

2. The jelly type food of claim 1, wherein the oil containing the polyunsaturated fatty acid originated from at least one raw material selected from the group consisting of fish, algae, and sea lions.

3. The jelly type food of claim 1, wherein the rosemary extract contains 2-10 wt % of carnosic acid.

4. The jelly type food of claim 1, wherein the polyunsaturated fatty acid is at least one selected from the group consisting of eicosapentaenoic acid (EPA), docosahexaenoic acid (DHA), docosapentaenoic acid (DPA), linoleic acid, linolenic acid, and arachidonic acid.

5. The jelly type food of claim 1, further comprising at least one antioxidant selected from the group consisting of vitamin C and ethylenediaminetetraacetic acid (EDTA).

6. The jelly type food of claim 5, wherein the antioxidant is contained in 0.005-1 wt % relative to a total wt % of the composition.

7. The jelly type food of claim 1, further comprising 1-10 wt % of a vegetable oil.

8. The jelly type food of claim 1, further comprising an acidulant, and a sugar solution.

9. The jelly type food of claim 8, wherein the acidulant is at least one selected from the group consisting of citric acid, anhydrous citric acid, sodium citrate, tartaric acid, malic acid, fumaric acid, succinic acid, and vitamin C.

10. The jelly type food of claim 8, wherein the gellant is at least one selected from the group consisting of starch, agar, pectin, gelatin, xanthan gum, alginate, and carrageenan.

11. The jelly type food of claim 8, wherein the sugar solution contains at least one selected from the group consisting of sugar, glucose, fructose, taffy, sugar syrups, dextrin, oligosaccharides, honey, propolis, and sugar alcohols.

12. A method for preparing a jelly type food containing an emulsified oil composition, the method comprising:
    an emulsified oil composition preparation step including a process of homogeneously mixing 30-98 wt % of an oil containing a polyunsaturated fatty acid which is applicable to food, 0.01-5 wt % of a rosemary extract, and 0.5-10 wt % of a non-ionic surfactant at 40-70° C.;
    a jelly type food composition preparation step including a process of mixing the emulsified oil composition, a gellant, an acidulant, and a sugar solution; and
    a step of placing the jelly type food composition in a mold, followed by drying at 15-25° C.

* * * * *